May 28, 1957 — B. W. WARNER — 2,793,616
ADJUSTABLE HEIGHT POULTRY FEEDER
Filed May 2, 1955 — 2 Sheets-Sheet 1
FIG. 1
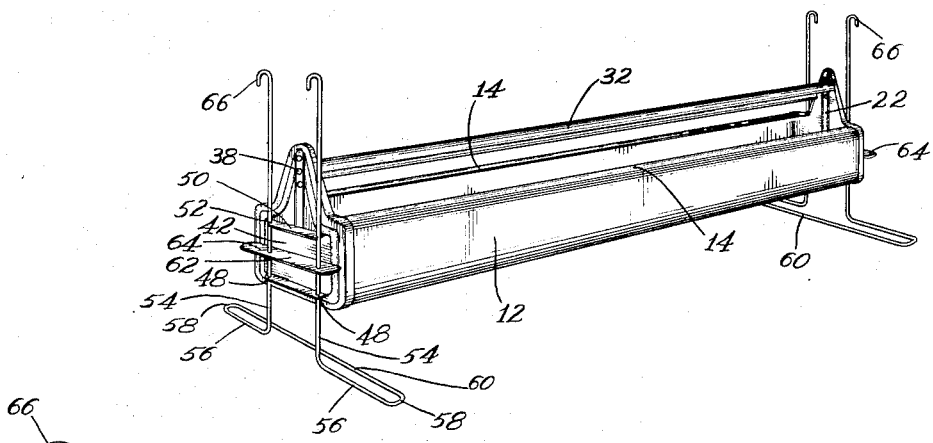
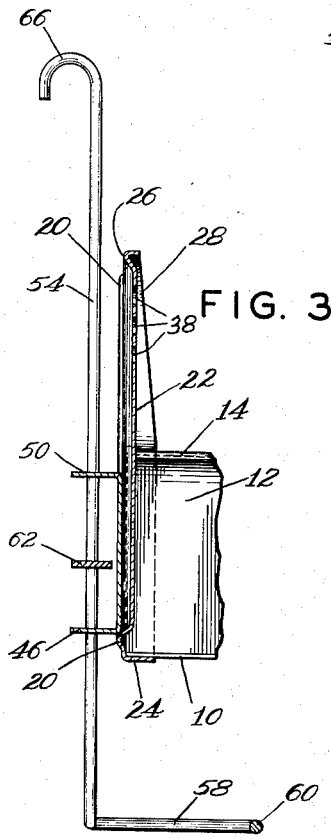
FIG. 3
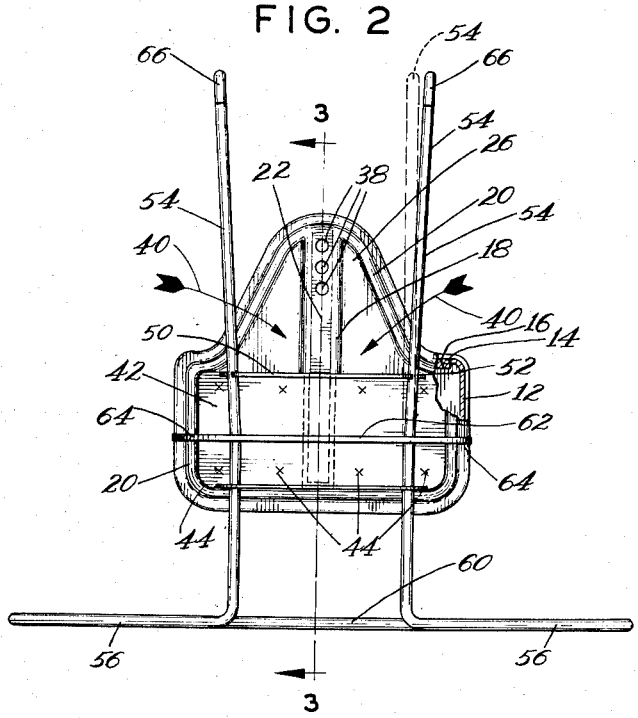
FIG. 2
INVENTOR
BOYD W. WARNER
BY
ATTORNEY May 28, 1957  B. W. WARNER  2,793,616
ADJUSTABLE HEIGHT POULTRY FEEDER
Filed May 2, 1955  2 Sheets-Sheet 2

INVENTOR
BOYD W. WARNER
BY
Donald H. Sweet
ATTORNEY

United States Patent Office 2,793,616
Patented May 28, 1957

2,793,616

ADJUSTABLE HEIGHT POULTRY FEEDER

Boyd W. Warner, North Manchester, Ind.

Application May 2, 1955, Serial No. 505,261

22 Claims. (Cl. 119—61)

My invention relates to poultry raising and includes among its objects and advantages a feeding trough particularly adaptable and convenient in connection with such operations as the rearing of broilers.

In the accompanying drawings:

Figure 1 is a perspective view of an assembled feeder according to the invention;

Figure 2 is an end view, partly in section and somewhat enlarged, of the feeder in the same position of adjustment;

Figure 3 is a further enlarged partial view on line 3—3 of Figure 2;

Figure 5:
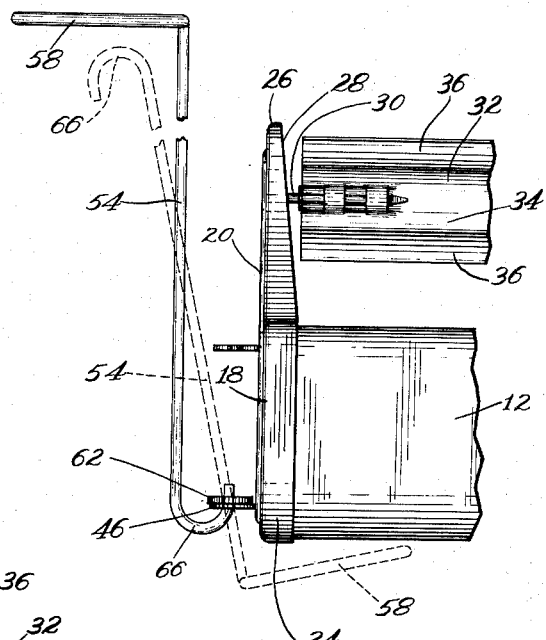
Figure 5 is a side elevation of the same parts in the positions occupied by them at the beginning of the assembly operation.
Figure 4:
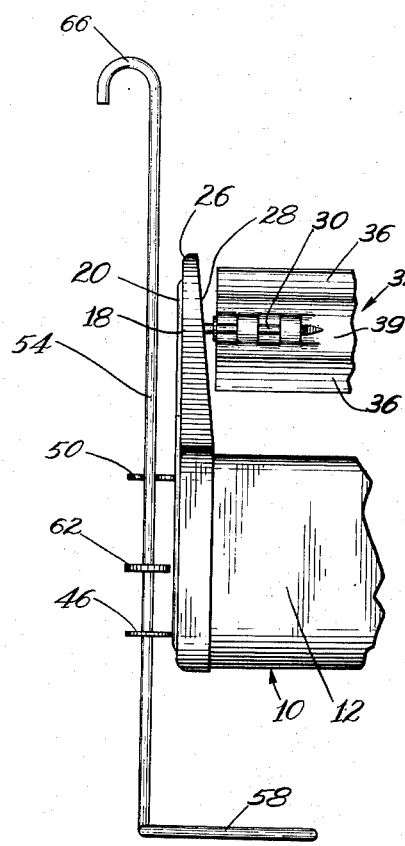
Figure 4 is a side elevation of the same portion illustrated in Figure 3.

In the embodiment selected to illustrate the invention the trough comprises a bottom wall 10 and parallel side walls 12 having inwardly turned flanges 14 along their upper edges, beaded by turning back narrow flaps 16 to secure a rounded edge that will avoid injury to the necks of the chicks. At each end I provide an end plate 18 having a peripheral embossing 20 and a central embossed groove at 22 and a peripheral flange 24. The end plate 18 fits over and closes the end of the trough members 10 and 12, 12 and is permanently affixed thereto, as by soldering. The flange 24 is of full width throughout its contact with the trough. The triangular, central, dome portion 26 of each end closure has its peripheral flange portion progressively reduced in width, as indicated at 28, so that the upper end of the dome portion can be conveniently sprung outward to permit the insertion of the pintle 30 of the rotary guard 32.

The guard 32 is well known in the art and, per se, forms no part of the present invention. Briefly, it comprises a flat plate 34 and opposite flanges 36 turned back about 120 degrees to define the shape of the letter "Z." The guard can be mounted at any one of three different heights by entering its pintles 30 in any one of three spaced holes 38 near the upper end of the dome 26. The guard functions to get in the way of birds who try to alight on the side flanges 14 of the trough. Any bird that tries to alight on the guard is promptly upset by the turning of the guard under the bird, and these two actions combined keep the birds away from the trough except for coming up on either side of it and putting their heads in, substantially in the positions indicated by the arrows 40 of Figure 2, to get access to the feed in the trough.

If the height of the trough above the ground is such that the birds can get their heads down toward the bottom of the trough easily, they will throw their heads from side to side in search of choice morsels, and throw a great deal of feed out of the trough onto the ground around the trough, where it is lost. Conversely, if the trough is so high that the birds cannot reach over the flanges 14 and get at the feed, it defeats its own purpose. Accordingly, as the birds grow in size, it becomes necessary to edge the trough up ¼ or ½ of an inch at a time to keep it at the optimum height to induce the birds to feed, and, at the same time, not waste the food.

Figure 6:
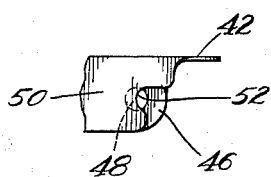
Figure 6 is a detail plan view of one end of the mounting cleat.

According to the invention, the main body of the end piece 18 is reinforced by spot-welding to it the body plate 42 of a double cleat. In Figure 2 the desirable locations for the spot-welds are indicated at 44, being eight in number. Along the central portion of the lower edge of the body plate 42 there extends outwardly a bottom shelf 46 containing two apertures 48 near its ends. From the central portion of the upper edge of the body plate 42, the top shelf 50 projects horizontally, and its outer edge is curved in to define notches 52. Each notch 52 opens outwardly, but the notches are spaced further apart than the holes 48, as clearly indicated in Figures 2 and 6.

At each end I provide an end stand, or leg. Each leg includes two generally parallel risers 54 which are part of one integral length of wire rod. At their lower ends the risers merge with outwardly directed short foot reaches 56. The short reaches 56 are continued at their remote ends in U-shaped bights 58, and the bights are united by a main long reach 60 extending the entire transverse length of the foot structure. On reference to Figures 1 and 2, it will be apparent that flexure of the wire rod to permit the risers 54 to flare outwardly, more or less out of parallelism with each other, is facilitated without bending the parts enough to create a permanent set or deformation, because the entirety of the reach 60 and bights 58 and outwardly extending portions 56 is free to flex and permit the risers 54 to have their upper ends either closer to or farther from each other.

Means are provided for quickly and firmly clamping the risers against sliding movement. In assembled position the risers pass upwardly through the holes 48 in the shelf 46, and then curve outwardly a little and lie in the notches 52. Between the shelves lies a locking plate 62 which is a simple flat metal plate having spaced holes to receive the risers 54, and having end portions at 64 extending outwardly about an inch beyond the ends of the lower shelf 46.

In Figures 1 to 4 inclusive, the parts are illustrated in clamped position. As best shown in Figure 2, the locking plate 62 has been drawn up so that the risers 54 are pinched toward each other by contact with the holes in the plate and flexed through a small angle, most clearly indicated in Figure 2 by dotted lines for the upper end of the right-hand riser 54, showing the extent of the flexure that produces a firm grip between the riser and the edges of the hole 48 and the notch 52, with the risers pressed forceably against those edges by the inward wedging action exerted by the plate 62.

With the parts in the position of Figure 2, if the user desires to lower the trough, the tips of two fingers are put under the shelf 46 at each end and the tip of one thumb on the projecting end of the plate 62 slides the plate 62 down onto the shelf and relieves the binding, so that the user can easily push the trough end down until the reach 60 is in direct contact with the bottom 10 of the trough. To raise the trough the plate 62 is pushed down in the same way and then the trough end is pulled up instead of down. During either operation the user usually stands with one foot on each of the foot reaches 56, because the residual friction of the risers is usually more than the weight of the leg, and if he stands on the foot, he can pull the trough up without lifting the leg. After the trough end is positioned on the exact level desired by the user, the thumb is transferred to the top of the shelf 50, and the finger tips to the bottom of the plate 62, and the plate 62 is drawn up to locking position. After using such a device a few times, the adjustments just described take much less time than it takes to read the foregoing description of them.

The upper ends of the risers 54 are turned outwardly and then downwardly to define U-shaped top hooks 66. In use, these hooks protect the birds. When the presence of food or the entrance of a person causes the birds to fly across the pen together, they not infrequently collide with the trough, and a bird that collided with a sharp, pointed end on the top of the riser 54 would be likely to injure itself seriously.

The hooks 66 perform another useful function in assembling the device. For shipment, the legs and locking plates are removed from the trough to make a more compact and convenient package. Upon receipt of the package the purchaser proceeds as indicated in Figure 5. First, the plate 62 is laid on the shelf 46 with the holes in register. Then the hooks 66 are inserted from below, passing up through the shelf and then through the plate with the leg itself upside down. The leg is now rotated through about 210 degrees and then slid up into the dotted-line position indicated in Figure 5. In this position it is easy to grasp the upper portions of the risers 54 and flex them away from each other a little and bring them back into a vertical plane when viewed as in Figure 5, and enter them into the notches 52. Assembly is now complete and the user merely draws up the locking plate 62.

The guard 32 can be slipped into place before or after assembling the legs.

Because the reaches 60 are positioned in under the bottom of the trough, it will be apparent that the downward movement of the trough can continue until contact between the middle of the reach 60 and the bottom of the trough limits further movement. In this condition of adjustment the trough would be separated from a smooth and rigid supporting surface by the diameter of the wire forming the reach 60. However, such troughs are customarily positioned on an irregular floor covered with litter or straw, so that, for all practical purposes, the bottom 10 of the trough is substantially on the ground. This provides a maximum range of adjustment to accommodate the trough to any bird large enough to reach over the flange 14 when standing on ground that is level with the bottom of the trough. Further, because the trough bottom is on the ground, the trough itself functions as an abutment along both side walls 12, so that even smaller birds can be taken care of by laying a ½ inch board or an inch of dirt piled up along each side of the trough to give the birds something to stand on, so that they can reach over the flange 14 far enough to get at the food.

Others may readily adapt the invention for use under various conditions of service by employing one or more of the novel features disclosed or equivalents thereof. It will, for instance, be obvious that it is immaterial whether the contents of the trough is liquid or solid. As at present advised, with respect to the apparent scope of my invention, I desire to claim the following subject matter:

1. An adjustable trough assembly comprising, in combination: a trough member; horizontal transversely extending shelves projecting longitudinally from each end of said trough; one of said shelves being near the lower level of said trough member and the other near the top of said trough member; a supporting leg and foot member at each end adjustably associated with said shelves; said leg and foot member having generally parallel laterally spaced risers extending upwardly through the horizontal planes of both shelves; said shelves each having edge portions shaped to at least partially embrace said risers; a locking plate positioned above said lower shelf and below said upper shelf; said locking plate having edge portions adapted to at least partially embrace said risers; the transverse spacing of the edge portions of said locking plate engaging said risers holding said risers closer together than one of said shelves but not closer than the other of said shelves; whereby said locking plate may be positioned adjacent the shelf with narrow spacing to permit said risers to slide up and down, or slid away from the shelf with narrow spacing toward the shelf with wide spacing to flex said risers and bind them frictionally against the edges of said shelves; and a bottom foot member permanently connected to the lower ends of said risers.

2. In an adjustable trough assembly of the type comprising, in combination: a trough member; and a supporting leg and foot member at each end of said trough member adjustably associated with said trough member; the combination of a leg and foot unit having generally parallel laterally spaced risers extending upwardly past the level of said trough near each end thereof; said trough member having horizontal upper and lower connecting portions shaped to at least partially embrace each riser at two vertically spaced points; and a unitary locking means extending across from one riser to the other for simultaneously pressing both risers toward each other and into frictional engagement with said connecting portions with sufficient force to support the weight of said trough firmly.

3. A combination according to claim 2 in which said locking means has a wedging action.

4. A combination according to claim 3 in which said locking means is a cross-piece having apertures to receive said risers; said cross-piece being slidable up and down on said risers; said connecting trough portions holding said risers in slightly diverging relationship; whereby sliding said cross-piece causes the edges of the cross-piece apertures to wedge said risers against said connecting portions.

5. A combination according to claim 4 in which said cross-piece pulls said risers toward each other to lock the parts.

6. A combination according to claim 5 in which said risers diverge upwardly and said cross-piece moves upward into locking position.

7. A combination according to claim 6 in which stop means are provided for limiting the downward movement of said cross-piece.

8. A combination according to claim 7 in which the downward movement of said cross-piece is arrested at the point where it exerts no wedging action.

9. A combination according to claim 4 in which said cross-piece apertures are holes defined by edges completely encircling said risers.

10. A combination according to claim 4 in which one connection member for each riser completely encircles said riser.

11. A combination according to claim 10 in which each pair of risers is connected by a bottom foot member.

12. A combination according to claim 11 in which one connecting member for each riser has an open-ended notch to receive the riser.

13. A combination according to claim 12 in which said risers and foot member are sufficiently flexible to permit each riser to be flexed around the edge portions adjacent its co-operating open-ended notch and sprung into said notch without distorting the parts beyond their elastic limit.

14. A combination according to claim 4 in which said connecting portions are longitudinal horizontal projections on a unitary vertical cleat plate.

15. A combination according to claim 14 in which said trough has a plate-like end closure, and said cleat plate lies against said end closure and is fastened to said end closure to reinforce and stiffen said end closure.

16. A combination according to claim 4 in which said lower connecting portions completely encircle said risers.

17. A combination according to claim 16 in which said cross-piece completely encircles said risers.

18. A combination according to claim 17 in which said upper connecting members have outwardly open U-shaped notches to receive said risers.

19. A combination according to claim 18 in which each riser terminates at its upper end in a U-shaped hook portion opening downwardly.

20. A combination according to claim 19 in which said risers are permanently connected at their bottoms by a resilient foot member; whereby said leg and foot unit may be assembled by inverting it to enter the ends of said hook portions up through said lower connecting portions, and through said cross-piece; thereafter inverting said unit by rotation around a transverse axis passing through said lower connecting portions; thereafter sliding said risers up beyond the level of said upper connecting portions; thereafter flexing said risers to spring them into the notches in said upper connecting portions.

21. In a chicken trough of adjustable height, in combination: a trough structure having end members; spaced upper and lower flanges projecting outwardly from each end of said trough; an adjustable leg comprising a foot portion and spaced risers extending up from said foot portion; said flanges receiving and positively engaging each of said risers at two vertical points; and frictional clamping means between said flanges and accessible to a user standing at that end of the trough drawing said risers together in adjusted position.

22. A combination according to claim 21, in which one flange has holes and encircles said risers, and the other flange has open notches receiving said risers.

References Cited in the file of this patent

UNITED STATES PATENTS

| | | |
|---|---|---|
| 1,287,699 | Kinsman | Dec. 17, 1918 |
| 2,165,968 | Hill | July 11, 1939 |
| 2,308,701 | Martin | Jan. 19, 1943 |
| 2,626,724 | Smallegan | Jan. 27, 1953 |